US007608312B1

(12) United States Patent
Edlein et al.

(10) Patent No.: US 7,608,312 B1
(45) Date of Patent: Oct. 27, 2009

(54) PRINTED ANTIFOG FILM

(75) Inventors: Marc A. Edlein, Belton, SC (US); Milton Bowen, Anderson, SC (US); Ram K. Ramesh, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 936 days.

(21) Appl. No.: 09/657,679

(22) Filed: Sep. 8, 2000

(51) Int. Cl.
*B29D 22/00* (2006.01)
*B29D 23/00* (2006.01)
*B32B 1/08* (2006.01)

(52) U.S. Cl. ................ 428/35.7; 428/320.2; 250/492.3; 427/596

(58) Field of Classification Search ................ 428/35.7, 428/335, 142, 199, 320.2, 327, 346, 411.1, 428/423.1, 524; 250/492.3; 427/596
See application file for complete search history.

(56) References Cited

U.S. PATENT DOCUMENTS

| | | | | |
|---|---|---|---|---|
| 3,850,675 | A | 11/1974 | Miller | 117/93.31 |
| 3,933,407 | A | 1/1976 | Tu et al. | 350/61 |
| 3,936,557 | A | 2/1976 | Watt | 428/211 |
| 3,976,614 | A * | 8/1976 | Elms et al. | 260/29.4 UA |
| 3,978,260 | A | 8/1976 | Dobbins et al. | 428/204 |
| 4,008,115 | A | 2/1977 | Fairbanks et al. | |
| 4,064,296 | A | 12/1977 | Bornstein et al. | 428/35 |
| 4,070,497 | A | 1/1978 | Wismer et al. | 427/44 |
| 4,197,344 | A | 4/1980 | Tshudy | 428/212 |
| 4,309,452 | A | 1/1982 | Sachs | 427/44 |
| 4,410,560 | A | 10/1983 | Kosterka | 427/44 |
| 4,439,480 | A | 3/1984 | Sachs et al. | 428/161 |
| 4,647,475 | A | 3/1987 | Inukai et al. | 427/44 |
| H304 | H | 7/1987 | Vorrier et al. | 522/92 |
| 4,842,906 | A | 6/1989 | Ekdahl et al. | 428/34.2 |
| 5,019,202 | A | 5/1991 | Kawahata et al. | 156/277 |
| 5,070,121 | A | 12/1991 | Hinterwaldner et al. | 524/31 |
| 5,084,344 | A | 1/1992 | Harada et al. | 428/334 |
| 5,330,799 | A | 7/1994 | Sandor et al. | 427/510 |
| 5,379,697 | A | 1/1995 | Ertl | 101/424.1 |
| 5,407,708 | A * | 4/1995 | Lovin et al. | 427/493 |
| 5,451,460 | A | 9/1995 | Lu et al. | 428/349 |

(Continued)

FOREIGN PATENT DOCUMENTS

| | | |
|---|---|---|
| EP | 0 089 629 A3 | 9/1983 |

(Continued)

OTHER PUBLICATIONS

McIntyre, "UV-Cured Durable Top Coats: A Replacement for OPP & PET Film Laminations," Presented at Future-Pak 1997, Oct. 28-29, 1997 (together with MCTC-2318 & 2139 Data Sheets).

(Continued)

*Primary Examiner*—Michael C Miggins
(74) *Attorney, Agent, or Firm*—Daniel B. Ruble

(57) ABSTRACT

A printed antifog packaging film incorporates a cured reactive ink system or a cured reactive varnish system. The reactive ink system includes a radiation-cured ink or a cured thermoset ink. The reactive varnish system includes a radiation-cured varnish or a cured thermoset varnish. The cured reactive ink or varnish reduces the tendency of the antifog film to form a ghost condensate image of the printed image after the film has been unwound from a roll form and subjected to conditions that form moisture condensation on the film.

77 Claims, 1 Drawing Sheet

U.S. PATENT DOCUMENTS

| | | | | | |
|---|---|---|---|---|---|
| RE35,203 | E | | 4/1996 | Wakalopulos | 250/492.3 |
| 5,562,951 | A | | 10/1996 | Kamen | 427/493 |
| 5,407,708 | A | | 4/1997 | Lovin et al. | 427/493 |
| 5,645,639 | A | | 7/1997 | Doesburg et al. | 118/60 |
| 5,744,248 | A | | 4/1998 | Meixner et al. | 428/482 |
| 5,763,048 | A | | 6/1998 | Takahashi | 428/147 |
| 5,804,301 | A | | 9/1998 | Curatolo | |
| 5,837,335 | A | * | 11/1998 | Babrowicz | 429/34.9 |
| 5,888,649 | A | | 3/1999 | Curatolo et al. | |
| 5,945,183 | A | | 8/1999 | Johnson | 428/34.9 |
| 5,962,092 | A | * | 10/1999 | Kuo et al. | 428/34.9 |
| 6,046,330 | A | * | 4/2000 | Qinghong et al. | 544/327 |
| 6,060,136 | A | * | 5/2000 | Patrick et al. | 428/35.2 |
| 6,231,953 | B1 | * | 5/2001 | Mossbrook et al. | 428/195 |
| 6,426,507 | B1 | | 7/2002 | Rangwalla et al. | |
| 6,528,127 | B1 | * | 3/2003 | Edlein et al. | 427/494 |

FOREIGN PATENT DOCUMENTS

| | | | |
|---|---|---|---|
| EP | 0 544 052 | B1 | 6/1993 |
| EP | 0 737 593 | A2 | 10/1996 |
| GB | 2 284 787 | A | 6/1995 |
| JP | 57-059968 | | 4/1982 |
| JP | 57-157785 | | 9/1982 |
| JP | 9-302264 | | 11/1997 |
| WO | 97/04959 | | 2/1997 |
| WO | WO 97/28964 | | 8/1997 |
| WO | 98/51437 | | 11/1998 |
| WO | WO 99/00250 | | 1/1999 |
| WO | 00/47683 | | 8/2000 |

OTHER PUBLICATIONS

Davis et al, "Chemistry Considerations for Low-Voltage EB Applications," RadTech Report, pp. 18-20, Sep./Oct. 1996.

Dionne, "Can the energy-curing industry cash in on food-packaging opportunities?" Converting Magazine's Flex-Pack Management, vol. 4, No. 1, pp. 2-3 (Jan. 1, 1998).

Dionne, "UV/EB Curing stakes a claim on flexo-printed food packaging" Converting Magazine's Flex-Pack Management, p. 3 (Feb. 1, 1998).

Clinkunbroomer, "Through the Future is Bright for UV Inks, Wide Web Flexo Market Remains Elusive," American Ink Maker, pp. 23-26 (Sep. 1998).

Harris, "UV Coating—beyond stick and shine," FlexoTech, pp. 21-22 (Jun. 1998).

Burkart, "Product Trend Report: UV Inks and Curing," Flexo, pp. 46-49 (Sep. 1997).

Pierce & Stevens Corp., Miracure EB Curable Coatings, Product Brochure, "Formulated for Success: Coatings & Adhesives for Packaging and Graphic Arts" (Nov. 1998).

Northwest Coatings Corp., "Adhesives and Coatings that Exceed our Customers' Expectations," Product Brochures and Product Sheets.

Lauppi et al, "Advantages of Low Voltage Electron Beam Processing (80 kV-110 kV)," Europe '99 RadTech Conference Proceedings, Berlin, Germany, pp. 357-366 (Nov. 8-10, 1999).

Mcintyre, "'Total Package Concept:' Electron Beam Technology for Barrier, Adhesive, and Overcoat Applications," Presented at Future-Pak '95 (20 pages) (Sep. 13-15, 1995).

Wakalopulos, "Low Voltage or Ultra Low Voltage?. . . ," RadTech Report, pp. 10-15 (Jul./Aug. 1998).

Fletcher, "New Lower-Voltage EB Systems for Curing Polymers and Coatings," Journal of Coatings Technology, vol. 65, No. 822, pp. 61-63 (Jul. 1993).

Leach et al, *The Printing Ink Manual*, Chapter 11, pp. 636-677 (Fifth Ed., Kluwer Academic Publishers 1993).

* cited by examiner

PRINTED ANTIFOG FILM

BACKGROUND OF THE INVENTION

The present invention relates to antifog films useful for packaging food, and more particularly to printed antifog films having an improved ability to maintain antifogging characteristics after being rolled.

Refrigerated food items are often displayed to consumers by resting the food item in a tray and covering the top of the tray with a transparent plastic film wrap. Typically, the food tray will have a perimeter lip extending above the stored food item so that the plastic film covering the top of the tray does not touch most of the packaged food. In this arrangement, the consumer may see clearly through the plastic wrap to view the food item stored in the package.

Upon refrigeration of a food item packaged in this manner, a "fog" may form on the inner, food-contact or food-side of the film, especially if the packaged food item has a high-moisture content. The term "fog" describes the collection of small moisture droplets that condense on the inner side of the film wrap. Unfortunately, these water droplets may cloud the inner surface of the film and thus obstruct or disrupt the view through the film—resulting in a negative consumer perception because of the inability to see clearly the packaged food through the plastic film wrap.

There have been several approaches to reduce the negative effects of fogging. One approach involves dispersing one or more antifog agents in the plastic film resin during processing of the film. Once in the film resin, the antifog agent tends to migrate to the surface of the film and raise the surface tension of the film. As a result, the water on the film inner side tends to form a relatively continuous film-like, transparent sheet of water rather than a fog.

Another approach to minimize the negative effects of fogging on a film involves applying an antifog coating directly to the plastic film's inner, food-side surface. Although this approach adds the expense of an additional coating step, it provides the benefit of applying the antifog agent to the film surface where it is most effective at reducing fogging.

A plastic film wrap typically includes printed images on regions of the film's outer surface to provide the consumer with visual information. Ink is printed to the outer, non-food side of the film to avoid contacting the packaged food with the print ink.

For the convenience of the packager, anti-fog packaging films are often supplied in pre-printed roll form. When the printed film is helically wound about a central core in progressive layers to form a roll, the printed side of the film contacts the non-printed side of film. This rolled arrangement causes surface contact between the film's printed outer side and the film's non-printed inner side. This contact appears to reduce the antifog effectiveness of the antifog film in the areas where the inner, food-side surface of the film has contacted the printed region of the film's outer surface.

As a result, when a packager unrolls a printed antifog film, wraps a food tray containing a food product, and refrigerates the packaged food product, a fog may form on the inner side of the film corresponding to the area of the inner surface that had been in contact with the printed region of the outer film surface when the film was rolled. Yet, where the film's inner surface area did not contact the printed regions when the film was rolled, the antifog film appears to function as designed—that is, reduces the formation of fog. The term "ghosting" refers to this contrast between transparent areas in which the antifog functions as designed and the opaque area in which a fog forms—because the fogged area on the film's inner surface may form a "ghost image" of the printed area on the film's outer surface.

SUMMARY OF THE INVENTION

The present invention addresses one or more of the aforementioned problems. A packaging film includes an antifog film. A printed image is on the antifog film. The image includes a radiation-cured ink or a cured thermoset ink. In another embodiment, a packaging film includes an antifog film. A printed image is on the antifog film. An overprint varnish is on at least a substantial portion of the printed image. The overprint varnish includes a radiation-cured varnish or a cured thermoset varnish.

A method of reducing the tendency of ghosting in an antifog film includes printing an image on at least one side of an antifog film. An overprint varnish is applied over a substantial portion of the printed image. The overprint varnish comprises a radiation-curable varnishes or a thermoset varnishes. The varnish is subsequently cured.

The printed packaging film of the present invention presents several advantages. The film displays a reduced tendency for forming a ghost condensate image of the printed image after the film has been rewound to form a roll, and subsequently unwound for use in packaging that is exposed to conditions that form a moisture condensate on the film. The film thus provides a protective covering for a refrigerated packaged food item—for example, a refrigerated meat product on a tray—yet allows the consumer a pleasing, clear view of the stored food product without the disruption of a ghost condensate image. The printed antifog film also displays excellent print adhesion and gloss properties.

These and other objects, advantages, and features of the invention will be more readily understood and appreciated by reference to the detailed description of the invention and the drawings.

DETAILED DESCRIPTION OF THE INVENTION

Figure 1:
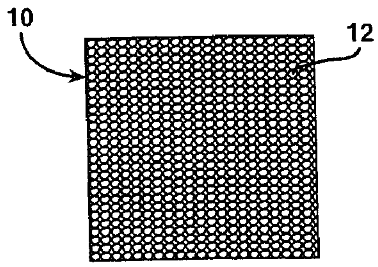
FIG. 1 is an actual-size plan view of a film having an Antifog Rating of 1.
Figure 2:
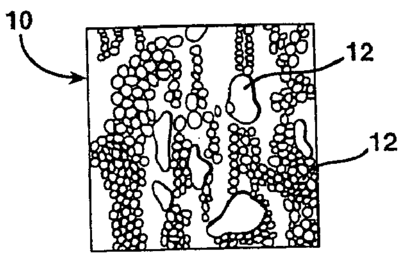
FIG. 2 is an actual-size plan view of a film having an Antifog Rating of 2.
Figure 3:
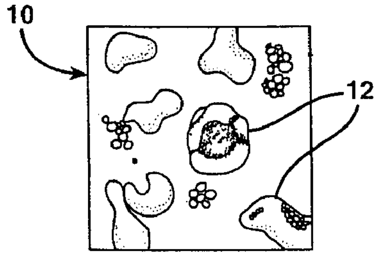
FIG. 3 is an actual-size plan view of a film having an Antifog Rating of 3.
Figure 4:
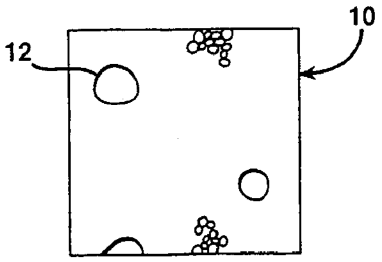
FIG. 4 is an actual-size plan view of a film having an Anti fog Rating of 4.
Figure 5:
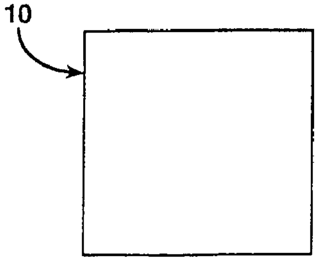
FIG. 5 is an actual-size plan view of a film having an Antifog Rating of 5.

The printed antifog film of the present invention comprises at least one of a reactive ink system to form a printed image or a reactive overprint varnish covering a printed image.

Antifog Film

An antifog film suitable for food packaging provides the structure (i.e., substrate film) upon which a printed image is applied. The term "antifog film" means a plastic film having at least one surface whose properties have been modified or adapted to have antifog characteristics—that is, a tendency to reduce or minimize the negative effects of moisture condensation. For example, an antifog film may incorporate or have dispersed in effective amounts one or more antifog agents in the plastic film resin before forming the resin into a film. Further, the antifog film may be a laminated film formed from two films laminated together, in which one film has antifog characteristics and the other film may not have antifog characteristics. Also, the antifog film may be multilayered (as discussed below), in which case the antifog agent may be incorporated in one or more of the layers of the film, preferably in one or more of the outer layers of the film. The antifog agent may be absent from (i.e., not incorporated in) one or more (or all) of the internal layers of the film. Preferably, at least one layer of the multilayered antifog film does not incorporate an antifog agent. Effective amounts of antifog agent in a film layer include (in ascending order of preference) from about 0.5% to about 12%, from about 1% to about 10%, from about 1.5% to about 8%, and from about 2% to about 6%, based on the total weight of the layer. Useful amounts of antifog agent in the film include less than about each of the following: 10%, 5%, 4%, 3%, and 2%, based on the total weight of the film. Ghosting appears to occur more prevalently at the lesser loadings of antifog agent.

Antifog agents are known in the art, and fall into classes such as esters of aliphatic alcohols, polyethers, polyhydric alcohols, esters of polyhydric aliphatic alcohols, polyethoxylated aromatic alcohols, nonionic ethoxylates, and hydrophilic fatty acid esters. Antifog agents include polyoxyethylene, sorbitan monostearate, polyoxyethylene sorbitan monolaurate, polyoxyethylene monopalmitate, polyoxyethylene sorbitan tristearate, polyoxyethylene sorbitan trioleate, poly(oxypropylene), polyethoxylated fatty alcohols, polyoxyethylated 4-nonylphenol, polyhydric alcohol, propylene diol, propylene triol, and ethylene diol, monoglyceride esters of vegetable oil or animal fat, mono- and/or diglycerides such as glycerol mono- and dioleate, glyceryl stearate, monophenyl polyethoxylate, and sorbitan monolaurate.

An antifog film may also be formed by applying to at least one surface of the film an antifog coating that contains in an effective amount one or more antifog agents. See, for example, U.S. Pat. No. 5,451,460 to Lu issued Sep. 19, 1995 entitled "Plastic Films with Surface Anti-Fog Properties" and International Publication No. WO/99/00250 published Jan. 7, 1999 entitled "Fog-Resistant Packaging Film," each of which is incorporated herein in its entirety by reference. The antifog coating is typically applied to one side of the film—the food side—not only to save cost in coating material, but also to avoid coating the non-food side of the film with an agent that may reduce the adhesion of the ink that will be printed on the non-food side.

Preferably, the antifog film is transparent so that the packaged item is visible through the film. "Transparent" as used herein means that the material transmits incident light with negligible scattering and little absorption, enabling objects (e.g., packaged food or print) to be seen clearly through the material under typical viewing conditions (i.e., the expected use conditions of the material).

The antifog effectiveness of an antifog film may be assigned a numerical value ("Antifog Rating") by visually comparing a sample film, which has been exposed to controlled fogging conditions, to reference standards (FIGS. 1-5) showing varying amounts and sizes of moisture condensate droplets on a film. The controlled fogging conditions are as follows. The sample film is secured over a mason jar that has about 10% of its internal volume filled with water at room temperature. The sealed jar is then placed in a refrigerator at 45° F. (7° C.). After 24 hours, the sealed jar is removed. The exposed sample film is visually compared to FIGS. 1-5 and assigned the Antifog Rating corresponding to the Figure that most closely resembles the appearance of the exposed sample film.

Referring to the drawings, FIG. 1 shows the representative concentration and size of moisture condensate droplets 12 on a 1 inch by 1 inch (25.4 mm by 25.4 mm) representative film section 10. FIG. 1 has an Antifog Rating of 1. In a similar manner, FIGS. 2-5 show the representative concentration and size of moisture condensate droplets 12 on the film 10, and have Antifog Ratings of 2 through 5, respectively. The film 10 of FIG. 1 essentially lacks antifog characteristics; whereas, the film 10 of FIG. 5 has excellent antifog characteristics. The effectiveness of the antifog increases as the Antifog Rating increases from 1 to 5.

The antifog film may comprise any plastic material, such as a thermoplastic, that is suitable for packaging food products. Useful plastics include homopolymers, copolymers, terpolymers, and heteropolymers of one or more of polyolefins, polyamides, polyesters, polyvinyls, polystyrenes, polyurethanes, polycarbonates, including polymers such as ethylene/vinyl alcohol copolymers (EVOH), polyvinylidene chlorides, polyalkylene carbonates, and starch-containing polymers.

Examples of useful plastics and multilayer films are described in U.S. Pat. Nos. 5,523,136 to Fischer et al; 5,866,214 to Ramesh; and 5,491,019 to Kuo; and International Publication No. WO 97/28964, each of which is incorporated herein in its entirety by reference. The outer layer of the antifog film may be of a composition adapted for heat sealing the antifog film to itself or another structure.

The antifog film may include one or more polyolefins in an amount (in ascending order of preference) of at least 20%, at least 40%, at least 50%, at least 60%, at least 65%, at least 70%, at least 75%, at least 80%, at least 85%, at least 90%, and at least 95% based on the weight of the total film. One or more of the outer layers of a multilayered antifog film may include one or more polyolefins in an amount (in ascending order of preference) of at least 10%, at least 20%, at least 40%, at least 50%, at least 60%, at least 65%, at least 70%, at least 75%, at least 80%, at least 85%, at least 90%, and at least 95% based on the weight of the layer.

The antifog film may be monolayer, but preferably includes two or more layers (i.e., multilayered), so that the layers in combination impart the desired performance characteristics to the antifog film. Each layer of the antifog film may include one or more thermoplastic materials. For example, the antifog film may include one or more layers comprising a polymer having mer units derived from ethylene, such as ethylene homopolymers and/or heteropolymers. Exemplary ethylene heteropolymers include those that include mer units derived from one or more of $C_3$-$C_{20}$ alpha-olefins, vinyl acetate, (meth)acrylic acid, and $C_1$-$C_{20}$ esters of (meth)acrylic acid. As used herein, "(meth)acrylic acid" means acrylic acid and/or methacrylic acid; and "(meth)acrylate" means an ester of (meth)acrylic acid.

Preferred heteropolymers include heterogeneous and homogeneous ethylene/alpha-olefin copolymers. As is known in the art, heterogeneous polymers have a relatively wide variation in molecular weight and composition distribution. Heterogenous polymers may be prepared with, for example, conventional Ziegler Natta catalysts. On the other hand, homogeneous polymers have relatively narrow molecular weight and composition distributions. Homogeneous polymers are typically prepared using metallocene or other single site-type catalysts. For a further discussion regarding homogenous polymers, see U.S. patent application Ser. No. 09/264,074 filed Mar. 8, 1999 by Edlein et al entitled "Method of Providing a Printed Thermoplastic Film Having a Radiation-Cured Overprint Coating" (as amended), which is also owned by the assignee of this application and is incorporated herein in its entirety by reference.

Ethylene/α-olefin copolymers or heteropolymers include medium density polyethylene (MDPE), linear low density polyethylene (LLDPE), and very low and ultra low density polyethylene (VLDPE and ULDPE), which, in general, are prepared by the copolymerization of ethylene and one or more α-olefins. Preferably, the comonomer includes one or more $C_4$-$C_{20}$ α-olefins, more preferably one or more $C_4$-$C_{12}$ α-olefins, and most preferably one or more $C_4$-$C_8$ α-olefins. Particularly preferred α-olefins include 1-butene, 1-hexene, 1-octene, and mixtures thereof.

The antifog film may comprise one or more layers, preferably a total of from 2 to 20 layers, more preferably at least 3 layers, even more preferably at least 4 layers, still more preferably at least 5 layers, and most preferably from 5 to 9 layers. A multilayered antifog film may include one or more of each of: i) a food-side or inside layer (i.e., heat seal layer), ii) a non-food or outside layer (i.e., print side layer), iii) a gas barrier layer, iv) a tie layer, v) an abuse layer, and vi) a bulk layer. Below are some examples of preferred combinations in which the alphabetical symbols designate the resin layers. Where the multilayer antifog film representation below includes the same letter more than once, each occurrence of the letter may represent the same composition or a different composition within the class that performs a similar function.

A/D, A/C/D, A/B/D, A/B/C/D, A/C/B/D, A/B/C/E/D, A/E/C/E/D, A/B/E/C/D, A/C/B/E/D, A/C/E/B/D, A/E/B/C/D, A/E/C/B/D, A/C/B/C/D, A/B/C/B/D, A/B/C/E/B/D, A/B/C/E/C/D, A/B/E/C/B/D, A/C/E/C/B/D, A/B/C/B/B/D, A/C/B/B/B/D, A/C/B/C/B/D, A/C/E/B/B/D, A/B/E/C/E/B/D, A/B/E/C/E/B/E/D

"A" is the inside layer, heat seal layer, or food-side layer, as discussed below.

"B" is a core or bulk layer, as discussed below.

"C" is a barrier layer, as discussed below.

"D" is an outside (print) layer, as discussed below.

"E" is a tie layer, as discussed below.

Heat Seal or Food-Side Layer

The antifog film may include a food-side layer or one or more heat-seal layers—that is, a layer adapted to facilitate the heat-sealing of the film to itself or to another object, such as a tray. The heat-seal layer is typically an outer layer and very often a food-side layer. Where fin seals are used, the antifog film need only include a heat-seal layer on the food-side (i.e., inside) of the multilayered antifog film. However, it is possible to include a heat-seal layer on the non-food side (i.e., outside) of the antifog film—in particular where the film is constructed in a balanced manner.

The heat seal/food-side layer may include one or more thermoplastic polymers including polyolefins (e.g., ethylene homopolymers, such as high density polyethylene ("HDPE") and low density polyethylene ("LDPE"), ethylene copolymers, such as ethylene/alpha-olefin copolymers ("EOAs"), propylene/ethylene copolymers, propylene/alpha-olefin copolymers, ethylene/unsaturated acid copolymers, and ethylene/unsaturated ester copolymers), polyamides, polyesters, polyvinyl chlorides, and ionomers. Preferred components for the heat seal layer include: i) copolymers of ethylene and vinyl acetate ("EVA") having vinyl acetate levels of from about 5 to 20 weight %, more preferably from about 8 to 12 weight %, and ii) (meth)acrylate polymers such as ethylene/(meth)acrylic acid ("EMAA"), ethylene/acrylic acid ("EAA"), ethylene/n-butyl acrylate ("EnBA"), and the salts of (meth)acrylic acid copolymers ("ionomers").

The heat seal/food-side layer may comprise one or more antifog agents, as well as other additives such as antiblock agents. However, the heat seal layer may be devoid of any or all of such agents.

The thickness of the heat seal or food-side layer is selected to provide sufficient material to effect a strong heat seal, yet not so thick so as to negatively affect the manufacture (i.e., extrusion) of the antifog film by lowering the melt strength of the film to an unacceptable level. The heat seal or food-side layer may have a thickness of one of the following ranges: from about 0.05 to about 6 mils (1.27 to 152.4 micrometer), from about 0.1 to about 4 mils (2.54 to 101.6 micrometer), from about 0.2 to about 4 mils, from about 0.5 to about 4 mils (12.7 to 101.6 micrometer), from about 0.5 to 2 mils, and from about 0.5 to 1 mil. Further, the thickness of the heat seal or food-side layer as a percentage of the total thickness of the antifog film may range (in ascending order of preference) from about 1 to about 50 percent, from about 5 to about 45 percent, from about 10 to about 45 percent, from about 15 to about 40 percent, from about 15 to about 35 percent, and from about 15 to about 30 percent.

Print Side Layer

The non-food or outside layer (i.e., print side layer) of the antifog film may be exposed to environmental stresses once the film is formed into a package. Such environmental stresses include abrasion and other abuse during processing and shipment. The outside layer preferably also provides heat-resistant characteristics to the film to help prevent "burn-through" during heat sealing. This is because in forming a package by conductance heat sealing the film to itself, the heat seal layer is placed in contact with itself, while the outside layer is proximate a heated jaw of a heat sealing apparatus. The heat seal jaw transfers heat through the outside layer to the heat seal layer of the package to soften the heat seal layer and form the heat seal.

Further, the outside layer of the antifog film provides the surface upon which the processor typically applies a printed image (e.g., printed information), such as by printing ink. As such, the outside layer is preferably capable of providing a surface that is compatible with selected print ink systems.

The print side layer may include one or more polyamides, polyethylene, and/or polypropylene either alone or in combination, for example, any one of these types of components in an amount of at least 50 weight %, more preferably at least 70%, still more preferably at least 90%, and most preferably 100% by weight of the layer. Suitable polyamides may include one or more of those identified in the "Other Layers" section below.

The outside layer may have a thickness of from about 0.05 to about 5 mils (1.27 to 127 micrometer), preferably from about 0.3 to about 4 mils (7.62 to 101.6 micrometer), and more preferably from about 0.5 to about 3.5 mils (12.7 to 88.9 micrometer). The thickness of the outside layer may range as a percentage of the total thickness of the antifog film of from about (in ascending order of preference) 1 to 50 percent, 3 to 45 percent, 5 to 40 percent, 7 to 35 percent, and 7 to 30 percent.

Barrier Layers

The antifog film may include one or more barrier layers between the inside and outside layers. A barrier layer reduces the transmission rate of one or more components—for example, gases or vapors or unreacted monomer—through the antifog film. Accordingly, the barrier layer of a film that is made into a package will help to exclude one or more components from the interior of the package—or conversely to maintain one or more gases or vapors within the package.

As used herein, "unreacted-monomer barrier layer" is a film layer that has a thickness and composition sufficient to impart to the film as a whole enhanced resistance to migration of unreacted monomer, unpolymerized material, reaction by-products or secondary products, and/or other migratable components of the varnish/ink (or derived from the varnish/ink) from a printed image or overprint varnish layer on the outside of the film. Specifically, such barrier layer enhances the antifog film such that it is capable of precluding more than 50 ppb of unreacted monomer from migrating through the antifog film, when tested according to the U.S. Food and Drug Administration ("FDA") migration test protocol (discussed below) under the following conditions: 10 days at 40° C. film exposure to one or more food simulants of: i) 95 weight % ethanol and 5 weight % water or ii) 5 weight % ethanol and 95 weight % water enclosed within a test container formed from the coated, printed film so that the food simulant contacts the food side of the antifog film and the ratio of volume of food simulant to surface area of coated, printed film is 10 milliliters per square inch.

A properly conducted migration study for a printed ink system for a packaging film is one that accurately simulates the condition of actual packaging use—and also uses analytical methods sensitive to the equivalent of 50 parts per billion (ppb). A reliable migration study for a printed packaging film typically involves either forming the film into a package that is filled with a food-simulating solvent (i.e., "food simulant") or by installing a specimen of the printed film in a migration cell for extraction by the food simulant. The volume of food simulant-to-film surface area should reflect the ratio expected to be encountered in the actual packaging application. The FDA set forth the protocol for obtaining reliable migration data; the FDA migration study protocols are discussed in "Recommendations for Chemistry Data for Indirect Food Additive Petitions," Chemistry Review Branch, Office of Premarket Approval, Center for Food Safety & Applied Nutrition, Food & Drug Administration (June, 1995), which is incorporated in its entirety by reference. A typical fatty-food simulant for the migration test is 95 weight % ethanol and 5 weight % water. A typical aqueous-food simulant for the migration test is 5 weight % ethanol and 95 weight % water. A representative food simulant-volume to film-surface area is 10 milliliters per square inch. The migration test may be conducted, for example, at 40° C. for 10 days.

The unreacted-monomer barrier layer may include one or more of the following polymers: ethylene/vinyl alcohol copolymer, polyvinyl alcohol, acrylonitrile-butadiene copolymer, isobutylene-isoprene copolymer, polyacrylonitrile, polyvinylidene chloride, highly crystalline polyamide, highly crystalline polypropylene, and highly crystalline polyethylene. Suitable polyamides may include one or more of those identified in the "Other Layers" section below. The term "highly crystalline" has a meaning generally understood to those of skill in the art. Crystallinity depends on how the film is produced—generally a film cooled slowly will have a higher crystallinity than one that is rapidly quenched. Further, a maximum amount of crystallinity exists for polyamides, polypropylenes and polyethylenes that is achieved using the most advantageous time/temperature path for cooling. A component may be considered "highly crystalline" herein if the amount of crystalline molecules is at least 70 weight percent of the maximum amount of crystallinity.

A gas barrier layer preferably has a thickness and composition sufficient to impart to the antifog film an oxygen transmission rate of no more than (in ascending order of preference) 500, 150, 100, 50, 20, 15, and 10 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985, which is incorporated herein in its entirety by reference.

Oxygen (i.e., gaseous $O_2$) barrier layers may include one or more of the following polymers: ethylene/vinyl alcohol copolymer ("EVOH"), vinylidene chloride copolymers ("PVDC"), polyalkylene carbonate, polyester (e.g., PET, PEN), polyacrylonitrile, and polyamide. EVOH may have an ethylene content of between about 20% and 40%, preferably between about 25% and 35%, more preferably about 32% by weight. EVOH includes saponified or hydrolyzed ethylene/vinyl acetate copolymers, such as those having a degree of hydrolysis of at least 50%, preferably of at least 85%. A barrier layer that includes PVDC may also include a thermal stabilizer (e.g., a hydrogen chloride scavenger such as epoxidized soybean oil) and a lubricating processing aid (e.g., one or more acrylates). PVDC includes crystalline copolymers, containing vinylidene chloride and one or more other monomers, including for example vinyl chloride, acrylonitrile, vinyl acetate, methyl acrylate, ethyl acrylate, ethyl methacrylate and methyl methacrylate.

A gas barrier layer may also be formed from a latex emulsion coating grade of vinylidene chloride/vinyl chloride copolymer having 5-15% vinyl chloride. The coating grade copolymer of vinylidene chloride/vinyl chloride may be present in an amount of from 5-100% (of total solids) with the remainder being 2-10% epoxy resin and melt extrusion grade material.

The barrier layer thickness may range from about (in order of ascending preference) 0.05 to 6 mils (1.27 to 152.4 micrometer), 0.05 to 4 mils (1.27 to 101.6 micrometer), 0.1 to 3 mils (2.54 to 76.2 micrometer), and 0.12 to 2 mils (3.05 to 50.8 micrometer).

Tie Layers

The antifog film may include one or more tie layers, which have the primary purpose of improving the adherence of two layers to each other. Tie layers may include polymers having grafted polar groups so that the polymer is capable of covalently bonding to polar polymers such as EVOH. Useful polymers for tie layers include ethylene/unsaturated acid copolymer, ethylene/unsaturated ester copolymer, anhydride-modified polyolefin, polyurethane, and mixtures thereof. Preferred polymers for tie layers include one or more of ethylene/vinyl acetate copolymer having a vinyl acetate content of at least 15 weight %, ethylene/methyl acrylate copolymer having a methyl acrylate content of at least 20 weight %, anhydride-modified ethylene/methyl acrylate copolymer having a methyl acrylate content of at least 20%, and anhydride-modified ethylene/alpha-olefin copolymer, such as an anhydride grafted LLDPE.

Modified polymers or anhydride-modified polymers include polymers prepared by copolymerizing an unsaturated carboxylic acid (e.g., maleic acid, fumaric acid), or a derivative such as the anhydride, ester, or metal salt of the unsaturated carboxylic acid with—or otherwise incorporating the same into—an olefin homopolymer or copolymer. Thus, anhydride-modified polymers have an anhydride functionality achieved by grafting or copolymerization.

The antifog film may include a tie layer directly adhered (i.e., directly adjacent) to one or both sides of an internal gas barrier layer. Further, a tie layer may be directly adhered to the internal surface of the outside layer (i.e., an abuse layer). The tie layers are of a sufficient thickness to provide the adherence function, as is known in the art. Each tie layer may be of a substantially similar or a different composition and/or thickness.

Other Layers

The antifog film may also include one or more layers to serve as other types of inner or outer layers, such as core, bulk, and/or abuse layers. Such a layer may include one or more polymers that include mer units derived from at least one of a $C_2$-$C_{12}$ α-olefin, styrene, amides, esters, and urethanes. Preferred among these are those homo- and heteropolymers that include mer units derived from ethylene, propylene, and 1-butene, even more preferably an ethylene heteropolymer such as, for example, ethylene/$C_3$-$C_8$ α-olefin heteropolymer, ethylene/ethylenically unsaturated ester heteropolymer (e.g., ethylene/butyl acrylate copolymer), ethylene/ethylenically unsaturated acid heteropolymer (e.g., ethylene/(meth)acrylic acid copolymer), and ethylene/vinyl acetate heteropolymer. Preferred ethylene/vinyl acetate heteropolymers are those that include from about 2.5 to about 27.5 weight %, preferably from about 5 to about 20%, even more preferably from about 5 to about 17.5% mer units derived from vinyl acetate. Such a polymer preferably has a melt index of from about 0.3 to about 25, more preferably from about 0.5 to about 15, still more preferably from about 0.7 to about 5, and most preferably from about 1 to about 3.

The antifog film may include a layer derived at least in part from a polyester and/or a polyamide. Examples of suitable polyesters include amorphous (co)polyesters, poly(ethylene/terephthalic acid), and poly(ethylene/naphthalate), although poly(ethylene/terephthalic acid) with at least about 75 mole percent, more preferably at least about 80 mole percent, of its mer units derived from terephthalic acid may be preferred for certain applications. Examples of suitable polyamides include polyamide 6, polyamide 9, polyamide 10, polyamide 11, polyamide 12, polyamide 66, polyamide 610, polyamide 612, polyamide 61, polyamide 6T, polyamide 69, heteropolymers made from any of the monomers used to make two or more of the foregoing homopolymers, and blends of any of the foregoing homo- and/or heteropolymers.

Antifog Film Thickness

The antifog film may have any total thickness as long as it provides the desired properties (e.g., flexibility, Young's modulus, optics, seal strength) for a given packaging application of expected use. Useful average thicknesses for the antifog film include less than about each of the following: 15 mils, 12 mils, 10 mils, 5 mils, 4 mils, 3 mils, 2 mils, 1.5 mils, and 1 mil. (A "mil" is equal to 0.001 inch.) Useful average thicknesses for the antifog film also include at least about each of the following: 0.3 mils, 0.5 mils, 0.6 mils, 0.75 mils, 0.8 mils, 0.9 mils, 1 mil, 1.2 mil, 1.4 mil, and 1.5 mil. The tendency for ghosting appears to increase as the antifog film thickness decreases.

Antifog Film Modulus

The antifog film preferably exhibits a Young's modulus sufficient to withstand the expected handling and use conditions. Young's modulus may be measured in accordance with one or more of the following ASTM procedures: D882; D5026-95a; D4065-89, each of which is incorporated herein in its entirety by reference. Preferably, the antifog film has a Young's modulus of at least (in ascending order of preference) about 100 MPa, about 200 MPa, about 300 MPa, and about 400 MPa, measured at a temperature of 100° C. Preferred ranges for Young's modulus for the antifog film include (in ascending order of preference) from about 70 to about 1000 MPa, and from about 100 to 500, measured at a temperature of 100° C. A higher modulus film has an enhanced stiffness, which helps to reduce the tendency of a printed image or varnish on the antifog film to crack when the printed film is flexed.

Orientation, Heat Shrinkability

The antifog film may be oriented in either the machine (i.e., longitudinal) or the transverse direction, preferably in both directions (i.e., biaxially oriented), in order to reduce the permeability and to increase the strength and durability of the antifog film. Preferably, the antifog film is oriented in at least one direction by a ratio of (in ascending order of preference) at least 2.5:1, from about 2.7:1 to about 10:1, at least 2.8:1, at least 2.9:1, at least 3.0:1, at least 3.1:1, at least 3.2:1, at least 3.3:1, at least 3.4:1, at least 3.5:1, at least 3.6:1, and at least 3.7:1.

The antifog film may be heat shrinkable, having a total free shrink at 185° F. (85° C.) of at least about (in ascending order of preference) 5%, 10%, 15%, 40%, 50%, 55%, 60%, and 65%. The total free shrink at 185° F. (85° C.) may also range (in ascending order of preference) from 40 to 150%, 50 to 140%, and 60 to 130%. The total free shrink is determined by summing the percent free shrink in the machine (longitudinal) direction with the percentage of free shrink in the transverse direction. For example, a film which exhibits 50% free shrink in the transverse direction and 40% free shrink in the machine direction has a total free shrink of 90%. Although preferred, it is not required that the film have shrinkage in both directions. The free shrink of the film is determined by measuring the percent dimensional change in a 10 cm×10 cm film specimen when subjected to selected heat (i.e., at a certain temperature exposure) according to ASTM D 2732, which is incorporated herein in its entirety by reference.

As is known in the art, a heat-shrinkable film shrinks upon the application of heat while the film is in an unrestrained state. If the film is restrained from shrinking—for example by a packaged good around which the film shrinks—then the tension of the heat-shrinkable film increases upon the application of heat. Accordingly, a heat-shrinkable film that has been exposed to heat so that at least a portion of the film is either reduced in size (unrestrained) or under increased tension (restrained) is considered a heat-shrunk (i.e., heat-contracted) film.

The antifog film may exhibit a shrink tension in at least one direction of (in ascending order of preference) at least 100 psi (689.6 kN/m2), 175 psi (1206.8 kN/m2), from about 175 to about 500 psi (1206.8 to 3448.0 kN/m2), from about 200 to about 500 psi (1379.2 to 3448.0 kN/m2), from about 225 to about 500 psi (1551.6 to 3448.0 kN/m2), from about 250 to about 500 psi (1724.0 to 3448.0 kN/m2), from about 275 to about 500 psi (1896.4 to 3448.0 kN/m2), from about 300 to about 500 psi (2068.8 to 3448.0 kN/m2), and from about 325 to about 500 psi (2241.2 to 3448.0 kN/m2). Shrink tension is measured at 185° F. (85° C.) in accordance with ASTM D 2838, which is incorporated herein in its entirety by reference.

The antifog film of the present invention may be annealed or heat-set to reduce the free shrink either slightly, substantially, or completely; however, the film may not be heat set or annealed once stretched if it is desired that the film have a high level of heat shrinkability.

Film Additives

One or more layers of the antifog film may include one or more additives useful in packaging films, such as, antifog agents, antiblocking agents, slip agents, colorants, pigments, dyes, flavorants, antimicrobial agents, meat preservatives, antioxidants, fillers, radiation stabilizers, and antistatic agents. Such additives, and their effective amounts, are known in the art.

Manufacture of the Antifog Film

The antifog film may be manufactured by a variety of processes known in the art, including extrusion (e.g., blown-film extrusion, coextrusion, extrusion coating, free film extrusion, and lamination), casting, and adhesive lamination. A combination of these processes may also be employed. These processes are well-known to those of skill in the art. For example, extrusion coating is described in U.S. Pat. No. 4,278,738 to Brax, which is incorporated herein in its entirety by reference. Coextrusion manufacture may use, for example, a tubular trapped bubble film process or a flat film (i.e., cast film or slit die) process. If the antifog film includes multiple layers, then preferably at least one internal layer is extruded without incorporating an antifog agent.

Energy Treatment of the Antifog Film

One or more of the thermoplastic layers of the antifog film—or at least a portion of the entire antifog film—may be cross-linked to improve the strength of the antifog film, improve the orientation of the antifog film, and help to avoid burn through during heat seal operations. Cross-linking may be achieved by using chemical additives or by subjecting the antifog film layers to one or more energetic radiation treatments—such as ultraviolet, X-ray, gamma ray, beta ray, and high energy electron beam treatment—to induce cross-linking between molecules of the irradiated material. The film may be exposed to radiation dosages of at least 5, preferably at least 7, more preferably at least 10, most preferably at least 15 kGy (kiloGrey). The radiation dosage may also range from 5 to 150, more preferably from 5 to 100, and most preferably from 5 to 75 kGy.

Film Surface Treatment

To improve the adhesion of the ink to the surface of the antifog film, all or a portion of the surface of the antifog film may be treated or modified before printing to change the surface energy of the antifog film. Surface treatments and modifications include: i) mechanical treatments, such as corona treatment, plasma treatment, and flame treatment, and ii) primer treatment. Surface treatments and modifications are known to those of skill in the art.

One type of oxidative surface treatment involves bringing the film into the proximity of an $O_2$- or $N_2$-containing gas (e.g., ambient air) which has been ionized. Exemplary techniques are described in, for example, U.S. Pat. Nos. 4,120,716 (Bonet) and 4,879,430 (Hoffman), which are incorporated herein in their entirety by reference. The antifog film may be treated to have a surface energy of at least about 0.034 J/m$^2$, preferably at least about 0.036 J/m$^2$, more preferably at least about 0.038 J/m$^2$, and most preferably at least about 0.040 J/m$^2$.

A flame treatment is less desirable for a heat-shrinkable film, since heat may prematurely shrink the film.

A primer may be based on any of the ink resins discussed below, preferably an ethylene vinyl acetate polymer (EVA) resin.

Printed Image

A printed image is applied to the antifog film, preferably to the non-food side of the film. To form the printed image, one or more layers of ink are printed on the film. The ink is selected to have acceptable ink adhesion, gloss, and heat resistance once printed on the film. Acceptable ink adhesions include (in ascending order of preference) at least 50%, at least 60%, at least 70%, at least 80%, at least 90%, and at least 95%, as measured by ASTM D3359-93, as adapted by those of skill in the film print art. The ink is preferably applied to the non-food side of the film in order to avoid contact of the packaged food with the ink. If the film is multilayered, the ink is preferably applied to the external or outer layer of the film.

The ink on the printed film should withstand without diminished performance the temperature ranges to which it will be exposed during packaging and use. For example, the ink on the printed film preferably withstands physical and thermal abuse (e.g., heat sealing) during packaging end-use, such as at temperatures of (in ascending order of preference) 100° C., 125° C., 150° C., and 175° C. for 3 seconds, more preferably 5 seconds, and most preferably 8 seconds.

Solvent-Based Ink

The printed image may comprise a solvent-based ink—that is, an ink that cures by evaporation of a solvent rather than by a chemical reaction (as with reactive inks discussed below). Solvent-based inks for use in printing packaging films include a colorant (e.g., pigment) dispersed in a vehicle that typically incorporates a resin (e.g., nitrocellulose, polyamide), a solvent (e.g., an alcohol), and optional additives. Inks and processes for printing on plastic films are known to those of skill in the art. See, for example, Leach & Pierce, The Printing Ink Manual, (5$^{th}$ ed., Kluwer Academic Publishers, 1993) and U.S. Pat. No. 5,407,708 to Lovin et al., each of which is incorporated herein in its entirety by reference.

Examples of solvent-based ink resins include those which have nitrocellulose, amide, urethane, epoxide, acrylate, and/or ester functionalities. Ink resins include one or more of nitrocellulose, polyamide, polyurethane, ethyl cellulose, (meth)acrylates, poly(vinyl butyral), poly(vinyl acetate), poly(vinyl chloride), and polyethylene terephthalate (PET). Ink resins may be blended, for example, as nitrocellulose/polyamide blends (NC/PA) or nitrocellulose/polyurethane blends (NC/PU).

Examples of ink solvents include one or more of water solvent or hydrocarbon solvent, such as alcohols (e.g., ethanol, 1-propanol, isopropanol), acetates (e.g., n-propyl acetate), aliphatic hydrocarbons, aromatic hydrocarbons (e.g., toluene), and ketones. The solvent may be incorporated in an amount sufficient to provide inks having viscosities, as measured on a #2 Zahn cup as known in the art, of at least about 15 seconds, preferably of at least about 20 seconds, more preferably of at least about 25 seconds, even more preferably of from about 25 to about 45 seconds, and most preferably from about 25 to about 35 seconds.

Reactive Ink System

If the printed antifog film lacks a reactive overprint varnish system (discussed below), then the printed image comprises a reactive ink system. "Reactive ink systems" include radiation-curable ink systems and thermoset ink systems. Preferably, the cured ink derived from the reactive ink system forms at least a portion of the surface of the printed image.

A radiation-curable ink system may incorporate one or more colorants (e.g., pigments) with the monomers and oligomer/prepolymers as discussed below with respect to the radiation-curable overprint varnish. Application and curing of a radiation-curable ink is similar to that as discussed in that section. Preferably, each of the inks used to make the printed markings on the antifog film surface are essentially free of photoinitiators, thus eliminating the possibility that such materials may migrate toward and into the product to be packaged.

A thermoset ink system may include one or more colorants (e.g., pigments) dispersed with the reactive components of a thermoset varnish system. Thermoset varnish systems are discussed below. Application and curing of a thermoset ink is similar to that as discussed with respect to thermoset varnishes.

Preferably, the printed antifog film comprises an amount of cured reactive ink effective to reduce the ghosting that occurs when a comparable printed antifog film without a cured reactive ink is rolled and unrolled. Effective amounts of cured reactive ink may be characterized as a weight percentage of the total ink system. Effective amounts include at least about (in ascending order of preference) 60%, 80%, 90%, 99%, and 100%.

Reactive Overprint Varnish System

If the printed image lacks a cured reactive ink system, then the printed antifog film further comprises a cured reactive overprint varnish (i.e., pigment-free overcoat) that covers or is on the printed image. Reactive overprint varnishes include radiation-curable varnish systems and thermoset varnish systems. The reactive overprint varnish may be applied over a printed image that comprises a cured reactive ink system. Generally, overprint varnish compositions may be similar to ink system compositions—except without the colorant (e.g., pigment) incorporated in the ink system. Preferably, the cured overprint varnish covers a substantial portion of the printed image. "Substantial portion" in this context means that the overprint varnish covers a sufficient portion of the printed image so that the antifogging characteristic of the printed antifog film is substantially maintained after the film has been rolled and unrolled.

The printed antifog film may comprise an amount of cured reactive overprint varnish that is effective to reduce the ghosting that occurs when a comparable printed antifog film without the cured reactive overprint varnish is rolled and unrolled. Effective amounts of cured reactive overprint varnish may be characterized as a weight percentage of the total varnish system. Effective amounts include at least about (in ascending order of preference) 60%, 80%, 90%, 99%, and 100%.

Preferably, the overprint varnish is transparent. Also preferably, the pre-cured overprint varnish has a viscosity such that it can be printed or applied in a similar manner as solvent-based inks.

Radiation-Curable Overprint Varnish

The reactive overprint varnish (i.e., overcoat) may be formed or derived from a radiation-curable (i.e., radiation-polymerizable) overprint varnish system. Such a system has the ability to change from a fluid phase to a highly cross-linked or polymerized solid phase by means of a chemical reaction initiated by a radiation energy source, such as ultraviolet ("UV") light or electron beam ("EB") radiation. Thus, the reactants of the radiation-curable overprint varnish system are "cured" by forming new chemical bonds under the influence of radiation. Radiation-curable inks and varnish systems are described in The Printing Ink Manual, Chapter 11, pp. 636-77 ($5^{th}$ ed., Kluwer Academic Publishers, 1993), of which pages 636-77 are incorporated in their entirety by reference.

The radiation-cured overprint varnish provides a protective covering to the underlying ink, thus reducing the migration of antifog agent from the antifog film while it is rolled, thereby reducing the tendency for ghosting. The radiation-cured overprint varnish also provides a protective covering having good flexibility without cracking; yet, since the radiation-cured overprint varnish is cross-linked after irradiation, the varnish resin is less likely to flow when exposed to heat during a heat seal operation. Further, the radiation-cured overprint varnish improves the abrasion resistance and gloss of the coated, printed antifog. The gloss is improved because radiation-cured overprint varnish systems are found to produce a smoother, more contiguous coating in comparison to solvent-based overprint varnish systems.

Radiation-curable overprint varnish systems or formulations include: i) monomers (e.g., low-viscosity monomers or reactive "diluents"), ii) oligomers/prepolymers (e.g., acrylates), and optionally iii) other additives, such as non-reactive plasticizing diluents. Radiation-curable overprint varnish systems that are cured by UV light also include one or more photoinitiators.

Radiation-curable overprint varnish systems curable by EB radiation do not require a photoinitiator, and may therefore be free of photoinitiator. Together, the monomers and oligomers/prepolymers may be grouped as "reactants."

One or more of each of the reactive diluents/monomers and oligomers/prepolymers in a pre-cured overprint varnish formulation may have (in ascending order of preference) at least one, at least two, from two to ten, from two to five, and from two to three units of unsaturation per molecule. As is known in the art, one unit of unsaturation per molecule is known as monofunctional; two units of unsaturation per molecule is known as difunctional; and so on. Two or more terminal polymerizable ethylenically unsaturated groups per molecule are preferred.

Exemplary reactive diluents include (meth)acrylate diluents, such as trimethylolpropane triacrylate, hexanediol diacrylate, 1,3-butylene glycol diacrylate, diethylene glycol diacrylate, 1,6-hexanediol diacrylate, neopentyl glycol diacrylate, polyethylene glycol 200 diacrylate, tetraethylene glycol diacrylate, triethylene glycol diacrylate, pentaerythritol tetraacrylate, tripropylene glycol diacrylate, ethoxylated bisphenol-A diacrylate, propylene glycol mono/dimethacrylate, trimethylolpropane diacrylate, di-trimethylolpropane tetraacrylate, triacrylate of tris(hydroxyethyl) isocyanurate, dipentaerythritol hydroxypentaacrylate, pentaerythritol triacrylate, ethoxylated trimethylolpropane triacrylate, triethylene glycol dimethacrylate, ethylene glycol dimethacrylate, tetraethylene glycol dimethacrylate, polyethylene glycol-200 dimethacrylate, 1,6-hexanediol dimethacrylate, neopentyl glycol dimethacrylate, polyethylene glycol-600 dimethacrylate, 1,3-butylene glycol dimethacrylate, ethoxylated bisphenol-A dimethacrylate, trimethylolpropane trimethacrylate, diethylene glycol dimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol dimethacrylate, pentaerythritol diacrylate, aminoplast (meth)acrylates; acrylated oils such as linseed, soya, and castor oils. Other useful polymerizable compounds include (meth)acrylamides, maleimides, vinyl acetate, vinyl caprolactam, polythiols, vinyl ethers, and the like.

Useful oligomers/prepolymers include resins having acrylate functionality, such as epoxy acrylates, polyurethane acrylates, and polyester acrylates, with epoxy acrylates preferred. Exemplary oligomers and prepolymers include (meth)acrylated epoxies, (meth)acrylated polyesters, (meth)acrylated urethanes/polyurethanes, (meth)acrylated polyethers, (meth) acrylated polybutadiene, aromatic acid (meth)acrylates, (meth)acrylated acrylic oligomers, and the like.

If the radiation-curable overprint varnish is formulated for curing by exposure to UV-light, then the overprint varnish includes one or more photoinitiators. Useful photoinitiators include the benzoin alkyl ethers, such as benzoin methyl ether, benzoin ethyl ether, benzoin isopropyl ether and benzoin isobutyl ether. Another useful class of photoinitiators include the dialkoxyacetophenones, exemplified by 2,2-dimethoxy-2-phenylacetophenone (i.e., Irgacure® 651 by Ciba-Geigy) and 2,2-diethoxy-2-phenylacetophenone. Still another class of useful photoinitiators include the aldehyde and ketone carbonyl compounds having at least one aromatic nucleus attached directly to the carboxyl group. These photoinitiators include, but are not limited to benzophenone, acetophenone, o-methoxybenzophenone, acetonaphthalenequinone, methyl ethyl ketone, valerophenone, hexanophenone, alpha-phenyl-butyrophenone, p-morpholinopropiophenone, dibenzosuberone, 4-morpholinobenzophenone, 4'-morpholinodeoxybenzoin, p-diacetylbenzene, 4-aminobenzophenone, 4'-methoxyacetophenone, benzaldehyde, alpha-tetralone, 9-acetylphenanthrene, 2-acetylphenanthrene, 10-thioxanthenone, 3-acetylphenanthrene, 3-acetylindone, 9-fluorenone, 1-indanone, 1,3,5-triacetylbenzene, thioxanthen-9-one, xanthene-9-one, 7-H-benz[de]-anthracen-7-one, 1-naphthaldehyde, 4,4'-bis(dimethylamino)-benzophenone, fluorene-9-one, 1'-acetonaphthone, 2'-acetonaphthone, 2,3-butedione, acetonaphthene, and benz[a] anthracene 7.12 diene. Phosphines such as triphenylphosphine and tri-o-tolylphosphine are also useful as photoinitiators.

Preferred photoinitiators have low volatility, do not noticeably discolor the cured varnish, and do not produce undesirable by-products in the cured varnish that could migrate through the antifog. Specific examples include Irgacure® 2959 and Irgacure® 819, both from Ciba Specialty Chemicals, and Esacure® KIP 150, supplied by Sartomer Company. It is also well known to those skilled in the art that the use of synergists/co-initiators may improve photocure and may optionally be used. The preferred synergists/co-initiators would not noticeably discolor the cured varnish, or produce undesirable by-products in the cured varnish that could migrate through the antifog. Specific examples include Ebecryl® P104, Ebecryl® P115 and Ebecryl® 7100, all supplied by UCB chemicals Corp.

The radiation-curable overprint varnish formulation may optionally include small amounts (e.g., from 0.05 to 15 weight %) of polymerization inhibitors, processing aids, slip aids, flowout aids, antiblock agents, plasticizers, adhesion promotors, and other additives or components, such as those FDA-approved for food contact (direct or indirect), for example, as recited in the U.S. Code of Federal Regulations, 21 C.F.R. Section 175.300, which is incorporated herein in its entirety by reference. Such additives themselves preferably are reactive in that they polymerize and/or crosslink upon exposure to ionizing radiation, so as to become incorporated into the polymer matrix of the overcoat—or are of a high enough molecular weight so that the chance of migration into or toward the antifog film is reduced or eliminated. Preferred materials include those that contain (meth)acrylate functionalities. However, the radiation-curable overprint varnish may optionally include from 0.05 to 50 weight % non-reactant polymer soluble in the radiation-curable overprint varnish.

Preferably, the radiation-curable overprint varnish system is one that relies upon a free-radical mechanism to initiate and propagate the cure reaction (i.e., a free-radical radiation-curable overprint varnish). However, there are available radiation-curable cationic overprint systems, which use UV-light to initiate the reaction; but do not rely upon a free-radical mechanism. Accordingly, the reaction may continue even if no additional UV-light is provided. However, radiation-curable cationic overprint systems may suffer cure inhibition from the moisture in air, the components of inks (e.g. pigments, fillers, some resins, printing additives), and additives in the antifog film that are alkaline in nature. The sensitivity to alkaline materials is such that even trace amounts of contaminants that are typically found in a production setting may inhibit and/or prevent the cure. Further, cationic cure systems are not typically curable using EB radiation within useful dose ranges unless there is a initiator present such as that used in photocuring.

Useful radiation-curable overprint varnish systems are commercially available. For example, an EB curable overprint varnish is available from Rohm & Haas (previously Morton International, Inc.'s Adhesives & Chemical Specialties) under the MOR-QUIK 477 trademark. It has a density of about 9.05 lb./gal at 25° C., a refractive index of 1.484, an acid number of 0.5 mg KOH/g, and a viscosity at 25° C. of 100 cps. It contains multifunctional acrylic monomer and acrylated epoxy oligomer. It is believed to be substantially free of monofunctional monomer. Less preferred form Rohm & Haas is MOR-QUIK 444HP, which is believed to include substantially more acrylic monomer than (i.e., about twice as much as) the MOR-QUIK 477 overprint varnish. A useful EB curable overprint varnish is also available from Sun Chemical under the product code GAIFBO440206.

Other radiation-curable overprint varnishes include that from Rohm & Haas under the MOR-QUIK 333; from Pierce and Stevens under the L9019, L9024, and L9029 product codes; from Cork Industries, Inc. under the CORKURE 119 HG, CORKURE 2053HG, CORKURE 601HG; from Environmental Inks and Coatings under the UF-170066 product code; and from Rad-Cure Corporation under the RAD-KOTE 115, RAD-KOTE K261, RAD-KOTE 112S, RAD-KOTE 708HS, and RAD-KOTE 709 trademarks.

Concentrations for Radiation-Cured Overprint Varnish

Useful concentrations of the reactants for a radiation-curable overprint varnish system vary from about 0 to about 95 weight % monomer and from about 95 to about 5 weight % oligomer/prepolymer. When copolymerizable components are included in the compositions, the amounts used depend on the total amount of ethylenically unsaturated component present; for example, in the case of polythiols, from 1 to 98% of the stoichiometric amount (based on the ethylenically unsaturated component) may be used.

More particularly, the radiation-curable overprint varnish system may include reactive monomer in an amount ranging from (in ascending order of preference) about 0 to about 60%, about 10 to about 50%, about 15 to about 40%, and about 15 to about 30%, based on the weight of the pre-reacted overprint varnish formulation. The oligomer/prepolymer may be present in amounts ranging from (in ascending order of preference) about 5 to about 90%, about 10 to about 75%, about 15 to about 50%, and about 15 to about 30%, also based on the weight of the pre-reacted overprint varnish formulation.

Useful overprint varnish formulations include (in ascending order of preference) less than 20%, less than 10%, less than 5%, less than 1%, and essentially free of monofunctional monomer, based on the weight of pre-reacted overprint varnish formulation. Useful overprint varnish formulation may also include (in ascending order of preference) less than 20%, less than 10%, less than 5%, less than 1%, and essentially free of monofunctional oligomer, based on the weight of pre-reacted overprint varnish formulation.

A UV-curable overprint varnish formulation may be similar to an electron beam formulation, except including photoinitiator. The preferred amount of photoinitiator present in a UV-curable system is the minimal amount sufficient to facilitate the curing reaction, since residual photoinitiator may remain in the overprint varnish to potentially migrate through the antifog film. Useful concentrations of photoinitiator include from about 0.5 to about 5%, more preferably from about 1 to about 3%, based on the weight of the pre-reacted overprint varnish system.

Viscosity of Radiation-Curable Overprint Varnish

The desired viscosity for the pre-reacted overprint varnish depends in part on the coating application method to be used. The pre-reacted overprint varnish preferably has a viscosity such that it may be printed or applied in a similar manner as solvent-based inks. Typical viscosity application ranges include (in ascending order of preference) from about 20 to about 4,000, from about 50 to about 1,000, from about 75 to about 500, and from about 100 to about 300 centipoise (cP) measured at 25° C. The pre-reacted overprint varnish may be heated in order to achieve the desired viscosity range; however, the temperature of the varnish preferably is maintained below that which will negatively affect the overprint varnish or heat the antifog film to an undesirable level—that is, a temperature that will deform or shrink the antifog film.

Thermoset Overprint Varnish System

The reactive overprint varnish may be formed by or derived from a thermoset varnish system, for example, a one-component reactive varnish system, a two-component reactive varnish system, and a multi-component reactive varnish system, all of which are known to those of skill in the art. (These varnish systems are also known as, for example, "two-part" reactive varnishes.)

A thermoset varnish system has the ability to change from a relatively low-viscosity mixture—in which the reactive components may be dissolved or suspended in a solvent so that the mixture is suitable for application by printing processes (such as rotary screen, gravure, or flexographic techniques)—to a cured (i.e., polymerized or cross-linked) solid condition upon exposure to suitable curing conditions that initiate or accelerate a chemical reaction by the reactive components after application to a film or printed image. Accordingly, the thermoset varnish systems are cured by chemical reaction (e.g., polymerization and/or cross-linking of the reactive components) upon exposure to appropriate curing conditions. Curing conditions typically require exposure to heat (e.g., elevated temperature) and/or ambient air as an oxygen source after application of the thermoset varnish. Thus, thermoset varnishes may be considered as having a non-radiation induced chemical reaction for curing. The carrier solvent, if present, typically evaporates during the curing process; this drying may be assisted by exposure to a heated air stream.

The cured thermoset varnish provides a protective covering to the underlying printed image, and is believed to reduce the migration of antifog agent from the antifog film to the printed image while the film is rolled, thereby reducing the tendency for ghosting. The selected thermoset varnish system is preferably one for which the cure conditions would not undesirably degrade the useful physical characteristics of the antifog film.

Useful thermoset varnishes include one or more of the following: thermoset polyurethane varnishes, thermoset polyolefin varnishes, thermoset polyamide varnishes, thermoset polyester inks, thermoset polyepoxide varnishes, thermoset melamine varnishes, and thermoset acrylate varnishes. These systems are known to those of skill in the art.

Examples of thermoset varnishes include two-component reactive varnishes such as an epoxy resin and a resin containing a hydroxyl, amino or carboxyl group, or a combination of a urethane resin and a polyester, an acrylic resin or a vinyl resin. Multi-component reactive varnish systems may also involve a combination of a reactive polyol resin and polyisocyanate to produce polyurethane varnishes. Other useful thermoset varnishes include the two-part reactive varnishes available, for example, as a thermoset melamine system from Flint Ink Corporation (USA) under the PROCURE tradename, and as a thermoset urethane system from Schmidt Printing Inks LTD. (Canada) as a combination of the first part MG-9911-A (urethane base resin) and the second part MG-9909 (hardener or catalyst). A one-component reactive varnish having a base resin of acrylic is available from Watertight-Coate (USA).

Overprint Varnish Thickness

The reactive overprint varnish is applied in a thickness that once cured is effective to provide the desired performance enhancement—namely, reduce or eliminate the ghosting that would otherwise occur for a comparable printed antifog film without the cured reactive overprint varnish when the film is rolled and unrolled. The overprint varnish preferably provides other enhancements, for example, of the gloss, heat resistance, abrasion resistance (during film handling and processing) and/or chemical resistance (e.g., to fatty acids, oils, processing aids). However, the cured overprint varnish thickness should be thin enough not to crack upon flexing or to restrict the antifog film from shrinking or flexing as required by the desired application. Useful cured overprint varnish average thicknesses include the following ranges: from about 0.1 to about 12 μm, from about 0.5 to about 10 μm, from about 1.0 to about 8 μm, from about 1.5 to about 5 μm, and from about 1.5 to about 2.5 μm.

Appearance and Performance Characteristics

The printed antifog film of the present invention preferably has low haze characteristics. Haze is a measurement of the transmitted light scattered more than 2.5° from the axis of the incident light. Haze is measured against the outside (i.e., overprint coated side) of the coated, printed film, according to the method of ASTM D 1003, which is incorporated herein in its entirety by reference. All references to "haze" values in this application are by this standard. Preferably, the haze is no more than about (in ascending order of preference) 20%, 15%, 10%, 9%, 8%, 7%, and 6%.

The printed antifog film of the present invention preferably has a gloss, as measured against the outside (overprint varnish side) of at least about (in ascending order of preference) 40%, 50%, 60%, 63%, 65%, 70%, 75%, 80%, 85%, 90%, and 95%. All references to "gloss" values in this application are in accordance with ASTM D 2457 (60° angle), which is incorporated herein in its entirety by reference. Increasing the thicknesses of an overprint varnish tends to increase the gloss of the coated, printed film.

Preferably, the coated, printed film is transparent (at least in the non-printed regions) so that a packaged food item is visible through the film. "Transparent" as used herein means that the material transmits incident light with negligible scattering and little absorption, enabling objects (e.g., packaged food or print) to be seen clearly through the material under typical viewing conditions (i.e., the expected use conditions of the material).

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993), of which pages 173-80 is incorporated herein by reference.

The printed antifog film, once formed into a package (as discussed below), is preferably capable of withstanding normal packing, distribution, and handling with minimal ink loss from the coated, printed film. Preferably, the printed antifog film is capable of being flexed or shrunk without cracking or degrading the overprint varnish (if present)—or distorting or removing the printed image.

Application of the Ink and Overprint Varnish

The antifog film may be printed by any suitable method, such as rotary screen, gravure, or flexographic techniques, as is known in the art. The printed image is applied to the antifog film by printing the ink on the antifog film, preferably the outer non-food side of the film. If a solvent-based ink (i.e., a non-chemically reactive ink) is applied to the antifog film, the solvent evaporates, leaving behind the resin-pigment combination. The solvent may evaporate as a result of heat or forced air exposure to speed drying. The ink may be applied in layers, each with a different color, to provide the desired effect. For example, a printing system may employ eight print stations, each station with a different color ink.

An overprint varnish may be applied by any of the techniques known in the art, including screen, gravure, flexographic, roll, and metering rod coating print techniques, and by in-line, stack, and central impression configurations. Although application of the overcoat may occur separate in time and/or location from application of the printed image, it preferably occurs in-line with application of the ink that forms the printed image. For example, the overprint varnish may be applied to the printed image using the last stage of a multi-stage flexographic printing system.

If a radiation-curable ink or varnish is used, then after application of the pre-reacted ink or varnish to the film, the film is exposed to radiation sufficient to cure the ink or varnish. This polymerizes and/or crosslinks the reactants in the ink or varnish. An electron beam is the preferred form of radiation, although UV-light radiation may be used if the radiation-curable ink or varnish is formulated with photoinitiator. The radiation source for an EB system is known as an EB generator.

Two factors are important in considering the application of EB radiation: the dose delivered and the beam penetration. The dose is measured in terms of quantity of energy absorbed per unit mass of irradiated material; units of measure in general use are the megarad (Mrad) and kilogrey (kGy). The depth of penetration by an electron beam is directly proportional to the energy of the accelerated electrons impinging on the exposed material (expressed as kiloelectron volts, keV).

Regardless of the radiation source, the radiation dose is preferably sufficient to cure the reactants such that at least about (in ascending order of preference) 80%, 90%, 92%, 94%, 96%, 98%, 99%, and 100% of the reactive sites on the reactants polymerize and/or cross-link.

Preferably, however, the dosage and penetration are not so high so as to degrade the underlying printed image or antifog film. Useful radiation dosages range (in ascending order of preference) from about 0.2 to about 10 Mrads, from about 0.5 to about 9 Mrads, from about 0.8 to about 8 Mrads, from about 1 to about 7 Mrads, from about 1 to about 7 Mrads, from about 1 to about 6 Mrads, from about 1.2 to about 5 Mrads, from about 1.5 to about 4.5 Mrads, from about 1.8 to about 4 Mrads, from about 2 to about 3.0 Mrads. Useful energies for the EB range (in ascending order of preference) from about 30 to about 250 keV, from about 150 to 250 keV, from about 100 to 150 keV, from about 70 to about 100 keV, from about 50 to about 70 keV, from about 40 to about 50 keV, and from about 30 to about 40 keV. Preferably, the electron energy is less than about each of the following (in ascending order of preference): 250 keV, 200 keV, 150 keV, 140 keV, 130 keV, 120 keV, 110 keV, 100 keV, 95 keV, 90 keV, 85 keV, 80 keV, 75 keV, 70 keV, 60 keV, 50 keV, and 40 keV.

Irradiating the EB-curable ink or varnish with electrons having an energy of less than about (in ascending order of preference) 150 keV, 100 keV, 80 keV, 70 keV, 60 keV, and 50 keV enhances the abrasion and solvent-rub resistance of the resulting film. It is believed that these lower energies increase the cross-linking within the ink or varnish. Further, the use of EB radiation with an energy of less than about 70 keV penetrates the antifog film less deeply than higher-voltage EB—and is therefore less likely to degrade the antifog film. For example, an EB-cured overprint varnish printed film cured at 50 keV had 70% less ink removal than equivalent samples cured at 200 keV. The lower-energy cured coated, printed films also has better solvent rub resistance.

Useful EB generation units include those commercially available from American International Technologies sold under the trademark MINI-EB (these units have tube operating voltages from about 30 to 70 kV) and from Energy Sciences, Inc. sold under the trademark EZ CURE (these units have operating voltages from about 70 to about 110 kV). EB generation units typically require adequate shielding, vacuum, and inert gassing, as is known in the art. If the processing techniques employed allow for the use of a low oxygen environment, the coating and irradiation steps preferably occur in such an atmosphere. A standard nitrogen flush can be used to achieve such an atmosphere. The oxygen content of the coating environment preferably is no greater than about 300 ppm, more preferably no greater than about 200 ppm, even more preferably no greater than about 100 ppm, still more preferably no greater than about 50 ppm, and most preferably no greater than about 25 ppm with a completely oxygen-free environment being the ideal.

If thermoset ink or varnish system is used, then before application the components of the thermoset system are mixed together, typically incorporating a suitable solvent or dispersant. The mixture is then applied using the techniques as discussed above. After application, the thermoset ink or varnish is exposed to conditions appropriate to cure (i.e., polymerize and/or cross-link) the system's reactive components. Curing may be effected by elevated temperature conditions, as discussed above. The solvent may also be evaporated at this point.

Use of the Printed Antifog Film

The printed antifog film of the present invention may be used to package a variety of products, preferably food products such as poultry (e.g., turkey or chicken breast), bologna, braunschweiger, beef (including whole muscle products such as roast beef), pork, lamb, and other meat products, cheese, and produce such as cut and uncut lettuce, carrots, radish, and celery, and more preferably food products that have a moisture content tending to cause fogging on plastic used to package the product.

As is known in the art, a food product may be characterized by its "water activity" ($A_w$), which is the ratio of the water vapor pressure above the food product to the vapor pressure of pure water at the same temperature. Thus, the $A_w$ numerically represents the relationship of the free water in a food product to the amount of water vapor in the atmosphere around the food product. The $A_w$ value may range from 1.0 for pure water to 0.0 for a complete absence of free water. The printed antifog film is preferably used to package a food product having an $A_w$ of greater than 0.5, more preferably greater than 0.8, even more preferably greater than 0.85, still more preferably greater than 0.90, and most preferably greater than 0.95.

If the printed antifog film is provided in a roll form, then the packager unrolls the film as needed for the packaging application. A bag for packaging the food product may be made from the printed antifog film by sealing the outer layer to itself in a selected region, as is known in the art. Useful bags include an end-seal bag, a side-seal bag, an L-seal bag (i.e., sealed across the bottom and along one side with an open top), or a pouch (i.e., sealed on three sides with an open top). Additionally, lap seals may be employed. After forming the bag, the product may be inserted into the bag, and the open end of the bag sealed to enclose the product.

The printed antifog film may also be wrapped around a product and heat sealed to form a package enclosing the product. If the printed antifog film is formed of a heat-shrinkable film, the resulting bag may be heated to shrink the film around the product.

The printed antifog film may also be used as a transparent wrap to cover and secure a food product that rests on a tray—that is, the film may be used as a tray overwrap. The printed antifog film may be adapted for use as a complete tray overwrap—namely, where the film is capable of completely covering the packaged food product and adhering or clinging to itself to complete the packaging closure. Further, the printed antifog film may be adapted for use as a lid-seal overwrap, in which case the film is adapted for adhering, sealing, or clinging to the tray to complete the packaging closure. In the lid-seal application, the printed antifog film may be exposed to heat associated with a film heat-seal operation. In such a case, the printed image of the antifog film includes an ink that is preferably capable of withstanding the temperature exposure associated with the heat seal, since the seal may contact the printed image area of the film.

The tray upon which the food product rests may be a flat sheet (i.e., without a perimeter lip) or may include a perimeter lip that extends above the base of the tray, as is known in the art. Preferably, the perimeter lip extends sufficiently so that the printed antifog film as a tray overwrap does not contact a substantial portion of the food product being packaged on the tray. "Substantial portion" in this context means that the film does not contact at least 60% of the food product surface area that is visible from the top view, more preferably at least 80%, and most preferably does not contact the food product at all. Where the printed antifog film does not contact the food product as an overwrap, the film may be spaced from the packaged food product by (in ascending order of preference) at least 1 mm, at least 3 mm, at least 5 mm, at least 7 mm, at least 10 mm, at least 15 mm, and at least 20 mm.

The printed antifog film may be capable of reducing or minimizing the ghosting caused by storage of a food product at less than 50° F. (10° C.), preferably at less than 40° F. (4.4° C.), for at least 5 minutes, preferably for at least 10 minutes, more preferably at least 15 minutes, and most preferably for at least 20 minutes.

A packaged food product may be made by: 1) providing an antifog film, 2) applying a printed image on at least one side of the antifog film to form a printed film, the printed image optionally formed by a radiation-curable ink or a thermoset ink that is subsequently cured, 3) optionally coating at least the printed image of the printed film with a radiation-curable varnish or a thermoset varnish, and subsequently curing the varnish to form a cured overprint varnish-coated, printed film, 4) forming a package comprising at least the film, 5) placing a food product within the package, and 6) sealing the package to enclose the food product.

The following example is presented for the purpose of further illustrating and explaining the present invention and is not to be taken as limiting in any regard. Unless otherwise indicated, all parts and percentages are by weight.

EXAMPLE

Samples 1 and 2 below are comparative samples; Samples 3-4 and 7-8 are according to the present invention.

| Sample No. | Ink Tradename | Ink Manufacturer | Ink Resin | OPV Tradename | OPV Manufacturer | OPV Resin | Antifog Rating |
|---|---|---|---|---|---|---|---|
| 1 | AXL | Color Converting Industries (USA) | PA | N/A | N/A | N/A | 1 |
| 2 | Esterthane III | Flint Ink Corporation (USA) | NC/PU | N/A | N/A | N/A | 1 |
| 3 | AXL | Color Converting Industries | PA | Mor-Quik 444 | Rohm & Haas Co. (USA) | Acrylate | 5 |

-continued

| Sample No. | Ink Tradename | Ink Manufacturer | Ink Resin | OPV Tradename | OPV Manufacturer | OPV Resin | Antifog Rating |
|---|---|---|---|---|---|---|---|
| | | (USA) | | | | | |
| 4 | Esterthane III | Flint Ink Corporation (USA) | NC/PU | Mor-Quik 445 | Rohm & Haas Co. (USA) | Acrylate | 5 |
| 7 | AXL | Color Converting Industries (USA) | PA | Procure | Flint Ink Corporation (USA) | Melamine | 4.5 |
| 8 | Esterthane III | Flint Ink Corporation (USA) | NC/PU | Procure | Flint Ink Corporation (USA) | Melamine | 4.5 |

All of the above ink systems are solvent-based. AXL ink is a modified cellulose alcohol reducible ink.

MOR-QUIK varnish systems are electron-beam curable varnishes comprising multifunctional acrylic monomer and acrylated epoxy oligomer.

PROCURE varnish is a two-component reactive overprint varnish.

Each sample was prepared using an equivalent plastic antifog film—namely, 0.75 mil (0.019 mm) thick, balanced five-layer, heat-shrinkable polyolefin antifog film. The outer layers of the film were made of ethylene/α-olefin copolymers and included about 3% antifog agents of mono- and di-glycerides and polyethoxylated fatty alcohols. An ethylene vinyl acetate polymer (EVA) resin-based HAPS-free primer from Sun Chemical was applied to one side of each film using a flexo hand proofer with an anilox roll count of 360 cells per inch and a rubber roll applicator. The viscosity of the primer was 18 seconds (#2 zahn cup). The primer was then air dried. The solvent-based ink was applied over the primer using the same hand proofer as above to form a printed image. The viscosity of the inks during application was from 30 to 35 seconds (#2 zahn cup). The ink was dried with a couple of passes of a hand held dryer.

The reactive overprint varnishes of Samples 3-4 and 7-8 were applied over the printed image of each sample using the above described hand proofer. Samples 3-4 were coated with an electron-beam curable overprint varnish that was cured at a dosage of 3 Megarad and an energy of 50 keV. The resulting thickness of the polymerized overprint varnish was about 1.5 micrometer. Samples 7-8 were coated with a two-part reactive thermoset varnish which was prepared by mixing 6 parts by weight catalyst component believed to be para-toluene sulphonic acid with the 94 parts by weight melamine-based reactant before coating the printed film. The resulting overprint coating was cured by passing a hot air dryer over the sample to evaporate the solvent portion. The resulting thickness of the cured overprint varnish was about 1.5 micrometers.

The resulting printed antifog film samples had a printed side and a non-printed side. The printed side of each film sample was placed against an equivalent film sample that was not printed. The resulting composite was subjected to sufficient pressure to simulate storage in a roll form typical in the industry. The films forming the composite were then separated. The Antifog Rating for the side of the unprinted film sample that had been compressed against the printed side of the corresponding printed film sample was determined, using the method for determining the Antifog Rating as discussed in the Antifog Film section above. Comparative Samples 1-2, which were compressed against the print side of film samples that had a solvent-based ink without a cured reactive overprint varnish, demonstrated significantly deteriorated antifogging characteristics, as shown by the Antifog Ratings of 1. However, samples 3-4 and 7-8, which were compressed against the print side of film samples that included a cured reactive overprint varnish, did not demonstrate significant deterioration of antifog characteristics, as shown by the Antifog Ratings of 4.5 and 5.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated.

What is claimed is:

1. A packaging film comprising:

an antifog film; and a printed image on the antifog film, the image comprising an electron-beam cured ink.

2. The film of claim 1 wherein the printed image comprises an amount of the cured ink effective to reduce the tendency of the antifog film to form a ghost condensate image of the printed image after the film has been rolled and unrolled.

3. The film of claim 1 wherein:

the antifog film has first and second sides, at least a portion of the first side of the film having an antifogging characteristic; and the printed image is on at least a portion of the second side of the film, the printed image comprising an effective amount of the cured ink to reduce ghosting after the film has been rolled and unrolled.

4. The film of claim 1 wherein the printed image has an outer surface opposite the antifog film and the outer surface comprises at least a portion of the cured ink.

5. The film of claim 1 wherein:

the antifog film has first and second sides and comprises a coating of antifog agent on at least a portion of the first side of the film; and the printed image is on at least a portion of the second side of the film.

6. The film of claim 1 wherein the antifog film comprises an antifog agent dispersed in at least a portion of the film.

7. The film of claim 1 wherein the antifog film has a total free shrink at 185° F. of at least about 5%.

8. The film of claim 1 wherein the cured ink is selected from the group consisting of a cured one-component reactive ink and a cured multi-component reactive ink.

9. The film of claim 1 where the cured ink comprises a cured two-component reactive ink.

10. The film of claim 1 wherein the printed image further comprises a solvent-based ink.

11. The film of claim 1 wherein the antifog film has an average thickness of less than about 3 mils.

12. The film of claim 1 wherein the cured ink has an average gloss of at least about 40% measured in accordance with ASTM D 2457 (60° angle).

13. A method of packaging a moisture-containing food product comprising at least partially enclosing the moisture-containing food product within the film of claim 1.

14. The film of claim 1 wherein the film has a roll form.

15. The film of claim 1 wherein the printed image is formed at least in part by applying to the antifog film an electron-beam curable ink and subsequently curing the ink to form the cured ink.

16. A method of forming the film of claim 15 comprising:
providing the antifog film;
applying to the antifog film an electron-beam curable ink; and
subsequently curing the curable ink to form the cured ink.

17. The film of claim 1 wherein the printed image is formed at least in part by applying an electron-beam curable ink to the antifog film and subsequently exposing the ink to an effective amount of electron-beam radiation to cure the ink.

18. The film of claim 17 wherein:
the electron-beam curable ink comprises one or more reactants having reactive sites; and
the radiation exposure comprises electron-beam radiation having an energy of less than about 100 keV in an amount sufficient to polymerize or cross-link at least about 80% of the reactive sites.

19. The film of claim 18 wherein the radiation exposure comprises electron-beam radiation having an energy of less than about 50 keV in an amount sufficient to polymerize or cross-link at least about 80% of the reactive sites.

20. A method of forming the film of claim 19 comprising:
providing the antifog film;
applying to the antifog film an electron-beam curable ink comprising one or more reactants having reactive sites; and
subsequently exposing the electron-beam curable ink to electron-beam radiation having an energy of less than about 50 keV in an amount sufficient to polymerize or cross-link at least about 80% of the reactive sites.

21. A method of forming the film of claim 18 comprising:
providing the antifog film;
applying to the antifog film an electron-beam curable ink comprising one or more reactants having reactive sites; and
subsequently exposing the electron-beam curable ink to electron-beam radiation having an energy of less than about 100 keV in an amount sufficient to polymerize or cross-link at least about 80% of the reactive sites.

22. The film of claim 17 wherein the electron-beam curable ink includes less than 20% monofunctional monomer based on the weight of the electron-beam curable ink.

23. A method of forming the film of claim 22 comprising:
providing the antifog film;
applying to the antifog film a electron-beam curable ink comprising less than 20% monofunctional monomer based on the weight of the electron-beam curable ink; and
subsequently exposing the electron-beam curable ink to an effective amount of electron-beam radiation to cure the electron-beam curable ink.

24. The film of claim 17 wherein the electron-beam curable ink includes less than 20% reactant diluent based on the weight of the electron-beam curable ink.

25. A method of forming the film of claim 24 comprising:
providing the antifog film;
applying to the antifog film an electron-beam curable ink comprising less than 20% reactant diluent based on the weight of the electron-beam curable ink; and
subsequently exposing the electron-beam curable ink to an effective amount of electron beam radiation to cure the electron-beam curable ink.

26. A method of forming the film of claim 17 comprising:
providing the antifog film;
applying to the antifog film an electron-beam curable ink; and
subsequently exposing the electron-beam curable ink to an effective amount of electron-beam radiation to cure the electron-beam curable ink.

27. A packaged food product comprising:
a tray having a food storage side;
a food product resting on the food storage side of the tray; and
the film of claim 1 covering at least the food storage side of the tray.

28. A packaging film comprising:
an antifog film;
a printed image on at least one side of the antifog film; and
an overprint varnish on at least a substantial portion of the printed image, the overprint varnish comprising an electron-beam cured varnish.

29. The film of claim 28 wherein the amount of the cured overprint varnish is effective to reduce the tendency of the antifog film to form a ghost condensate image of the printed image after the film has been rolled and unrolled.

30. The film of claim 28 wherein:
the antifog film has first and second sides, at least a portion of the first side of the film having an antifogging characteristic;
the printed image is on at least a portion of the second side of the film; and
the overprint varnish comprises an effective amount of cured varnish to reduce ghosting.

31. The film of claim 28 wherein the film comprises an antifog agent dispersed in at least a portion of the film.

32. The film of claim 28 wherein the film comprises an antifog coating applied to the first side of the film.

33. The film of claim 28 wherein the antifog film has a total free shrink at 185° F. of at least about 5%.

34. The film of claim 28 wherein the cured varnish is selected from the group consisting of a cured one-component reactive varnish and a cured multi-component reactive varnish.

35. The film of claim 28 where the cured varnish comprises a cured two-component reactive varnish.

36. The film of claim 28 wherein the printed image comprises a cured ink selected from the group consisting of radiation-cured inks and thermoset inks.

37. The film of claim 28 wherein the antifog film has an average thickness of less than about 3 mils.

38. The film of claim 28 wherein the cured varnish has an average gloss of at least about 40% measured in accordance with ASTM D 2457 (60° angle).

39. A packaged food product comprising:

a tray having a food storage side;

a food product resting on the food storage side of the tray; and the film of claim 28 covering at least the food storage side of the tray.

40. A method of packaging a moisture-containing food product comprising at least partially enclosing the moisture-containing food product within the film of claim 28.

41. The film of claim 28 wherein the film has a roll form.

42. The film of claim 28 wherein the printed image comprises a solvent-based ink.

43. The film of claim 42 wherein:

the antifog film has first and second sides, at least a portion of the first side of the film having an antifogging characteristic;

the printed image is on at least a portion of the second side of the film; and the electron-beam radiation cured overprint varnish comprises an effective amount of cured varnish to reduce ghosting.

44. The film of claim 42 wherein the film comprises an antifog agent dispersed in at least a portion of the film.

45. The film of claim 42 wherein the film comprises an antifog coating on the side of the film opposite the side bearing the printed image.

46. The film of claim 42 wherein the film has a total free shrink at 185° F. of at least about 5%.

47. The film of claim 42 wherein the cured varnish comprises a cured one-component reactive varnish.

48. The film of claim 42 wherein the cured varnish comprises a cured multi-component reactive varnish.

49. The film of claim 42 wherein the cured varnish comprises a cured two-component reactive varnish.

50. The film of claim 28 wherein the cured varnish is formed at least in part by applying to the printed image an electron-beam curable varnish and subsequently curing the varnish to form the cured varnish.

51. A method of forming the film of claim 50 comprising:

providing the antifog film;

applying the printed image on at least one side of the antifog film;

applying a electron-beam curable overprint varnish on at least a substantial portion of the printed image; and subsequently curing the electron-beam curable varnish to form the cured varnish.

52. The film of claim 28 wherein the cured varnish is formed at least in part by applying to the printed image an electron-beam curable varnish and subsequently exposing the varnish to an effective amount of electron-beam radiation to cure the varnish.

53. The film of claim 52 wherein:

the electron-beam curable varnish comprises one or more reactants having reactive sites; and the radiation exposure comprises electron-beam radiation having an energy of less than about 100 keV in an amount sufficient to polymerize or cross-link at least about 80% of the reactive sites.

54. The film of claim 53 wherein the radiation exposure comprises electron-beam radiation having an energy of less than about 50 keV in an amount sufficient to polymerize or cross-link at least about 80% of the reactive sites.

55. A method of forming the film of claim 54 comprising:

providing the antifog film;

applying the printed image on at least one side of the antifog film;

applying an electron-beam curable overprint varnish on at least a substantial portion of the printed image, wherein the electron-beam curable varnish comprises one or more reactants having reactive sites; and subsequently exposing the electron-beam curable varnish to electron-beam radiation having an energy of less than about 50 keV in an amount sufficient to polymerize or cross-link at least about 80% of the reactive sites.

56. A method of forming the film of claim 53 comprising:

providing the antifog film;

applying the printed image on at least one side of the antifog film;

applying an electron-beam curable overprint varnish on at least a substantial portion of the printed image, wherein the electron-beam curable varnish comprises one or more reactants having reactive sites; and subsequently exposing the electron-beam curable varnish to electron-beam radiation having an energy of less than about 100 keV in an amount sufficient to polymerize or cross-link at least about 80% of the reactive sites.

57. The film of claim 52 wherein the electron-beam curable varnish includes less than 20% monofunctional monomer based on the weight of the electron-beam curable varnish.

58. A method of forming the film of claim 57 comprising:

providing the antifog film;

applying the printed image on at least one side of the antifog film;

applying an electron-beam curable overprint varnish on at least a substantial portion of the printed image, wherein the electron-beam curable varnish comprises less than 20% monofunctional monomer based on the weight of the electron-beam curable varnish; and subsequently exposing the electron-beam curable varnish to an effective amount of electron beam radiation to cure the electron-beam curable varnish.

59. The film of claim 52 wherein the electron-beam curable varnish includes less than 20% reactant diluent based on the weight of the electron-beam curable varnish.

60. A method of forming the film of claim 59 comprising:

providing the antifog film;

applying the printed image on at least one side of the antifog film;

applying an electron-beam curable overprint varnish on at least a substantial portion of the printed image, wherein the electron-beam curable varnish comprises less than 20% reactant diluent based on the weight of the electron-beam curable varnish; and subsequently exposing the electron-beam curable varnish to an effective amount of electron-beam radiation to cure the electron-beam curable varnish.

61. A method of forming the film of claim 51 comprising:

providing the antifog film;

applying the printed image on at least one side of the antifog film;

applying a electron-beam curable overprint varnish on at least a substantial portion of the printed image; and subsequently exposing the electron-beam curable varnish to an effective amount of electron-beam radiation to cure the electron-beam curable varnish.

62. A packaging film comprising:

an antifog film; and a printed image on at least one side of the antifog film; and an electron-beam curable overprint varnish on at least a substantial portion of the printed image.

63. The film of claim 62 wherein the film comprises an antifog agent dispersed in at least a portion of the film.

64. The film of claim 62 wherein the film comprises an antifog coating on the side of the film opposite the side bearing the printed image.

65. The film of claim 62 wherein the film has a total free shrink at 185° F. of at least about 5%.

66. The film of claim 62 wherein the varnish comprises a curable one-component reactive varnish.

67. The film of claim 62 wherein the varnish comprises a curable multi-component reactive varnish.

68. The film of claim 62 wherein the varnish comprises a curable two-component reactive varnish.

69. A method of reducing the tendency of ghosting in an antifog film, the method comprising:

printing an image on a side of an antifog film to form a print side of the film and an opposing side of the film;

applying an electron-beam curable overprint varnish over a substantial portion of the printed image;

subsequently curing the varnish by exposing the electron-beam curable varnish to electron-beam radiation;

subsequently winding the antifog film to form a roll;

subsequently unwinding at least a portion of the antifog film from the roll and exposing the portion of the film to conditions that form a moisture condensate on the opposing side of the film.

70. The method of claim 69 wherein the curing comprises exposing the varnish to an effective amount of electron-beam radiation to cure the varnish by a free radical mechanism.

71. The method of claim 69 wherein:

the overprint varnish comprises an electron-beam curable varnish comprising one or more reactants having reactive sites; and the curing comprises exposing the electron-beam curable varnish to electron-beam radiation having an energy of less than about 100 keV in an amount sufficient to polymerize or cross-link at least about 80% of the reactive sites.

72. The method of claim 69 wherein:

the overprint varnish comprises an electron-beam curable overprint varnish comprising one or more reactants having reactive sites; and the curing comprises exposing the electron-beam curable varnish to electron-beam radiation having an energy of less than about 50 keV in an amount sufficient to polymerize or cross-link at least about 80% of the reactive sites.

73. The method of claim 69 wherein:

the overprint varnish comprises an electron-beam curable varnish comprising less than 20% monofunctional monomer based on the weight of the electron-beam curable varnish; and the curing comprises exposing the electron-beam curable varnish to an effective amount of electron-beam radiation to cure the electron-beam curable varnish.

74. The method of claim 69 wherein:

the overprint varnish comprises an electron-beam curable varnish comprising less than 20% reactant diluent based on the weight of the electron-beam curable varnish; and the curing comprises exposing the electron-beam curable varnish to an effective amount of electron-beam radiation to cure the electron-beam curable varnish.

75. The method of claim 69 wherein the antifog film comprises an antifog agent dispersed in at least a portion of the antifog film.

76. The method of claim 69 wherein the antifog film comprises an antifog coating on the side of the film opposite the side bearing the printed image.

77. The method of claim 69 wherein antifog film has a total free shrink at 185° F. of at least about 5%.

* * * * *